US012425195B2

(12) United States Patent
Song et al.

(10) Patent No.: US 12,425,195 B2
(45) Date of Patent: Sep. 23, 2025

(54) CLIENT-SIDE SHARING OF CRYPTOGRAPHIC KEYS

(71) Applicant: ServiceNow, Inc., Santa Clara, CA (US)

(72) Inventors: Jiayin Song, San Francisco, CA (US); Matis Granger, San Francisco, CA (US); Shu-Wei Hsu, San Francisco, CA (US)

(73) Assignee: Service Now, Inc., Santa Clara, CA (US)

( * ) Notice: Subject to any disclaimer, the term of this patent is extended or adjusted under 35 U.S.C. 154(b) by 199 days.

(21) Appl. No.: 18/225,448

(22) Filed: Jul. 24, 2023

(65) Prior Publication Data

US 2025/0038960 A1    Jan. 30, 2025

(51) Int. Cl.
*H04L 9/08*    (2006.01)
*H04L 9/32*    (2006.01)

(52) U.S. Cl.
CPC .......... *H04L 9/0825* (2013.01); *H04L 9/0861* (2013.01); *H04L 9/3226* (2013.01)

(58) Field of Classification Search
CPC ... H04L 9/0825; H04L 9/0861; H04L 9/3226; H04L 2209/76
See application file for complete search history.

(56) References Cited

U.S. PATENT DOCUMENTS

| | | |
|---|---|---|
| 4,941,084 A | 7/1990 | Terada |
| 5,185,860 A | 2/1993 | Wu |
| 5,237,518 A | 8/1993 | Sztipanovits |
| 5,261,097 A | 11/1993 | Saxon |
| 5,265,252 A | 11/1993 | Rawson, III |
| 5,367,685 A | 11/1994 | Gosling |
| 5,390,297 A | 2/1995 | Barber |
| 5,442,791 A | 8/1995 | Wrabetz |
| 5,452,415 A | 9/1995 | Hotka |
| 5,522,042 A | 5/1996 | Fee |
| 5,533,116 A | 7/1996 | Vesterinen |
| 5,655,081 A | 8/1997 | Bonnell |

(Continued)

FOREIGN PATENT DOCUMENTS

| | | |
|---|---|---|
| EP | 0433979 A2 | 6/1991 |
| EP | 1607824 A2 | 12/2005 |

(Continued)

OTHER PUBLICATIONS

ServiceNow, Utah Platform Security, Jun. 24, 2023.

(Continued)

*Primary Examiner* — Henry Tsang
(74) *Attorney, Agent, or Firm* — McDonnell Boehnen Hulbert & Berghoff LLP

(57) ABSTRACT

An example may involve determining that a first proxy server is to share security credentials with a set of one or more proxy servers, wherein the set of one or more proxy servers is associated with the security credentials, and wherein the set of one or more proxy servers includes a second proxy server; transmitting, to the second proxy server, a request for the first proxy server to have access to the security credentials; and receiving, from the second proxy server, a credential key in an encrypted form, wherein the credential key is configured to decrypt the security credentials.

18 Claims, 10 Drawing Sheets

(56) References Cited

U.S. PATENT DOCUMENTS

| | | |
|---|---|---|
| 5,659,736 A | 8/1997 | Hasegawa |
| 5,671,412 A | 9/1997 | Christiano |
| 5,696,701 A | 12/1997 | Burgess |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke |
| 5,887,139 A | 3/1999 | Madison, Jr. |
| 5,909,217 A | 6/1999 | Bereiter |
| 5,937,165 A | 8/1999 | Schwaller |
| 5,949,976 A | 9/1999 | Chappelle |
| 5,978,594 A | 11/1999 | Bonnell |
| 6,021,437 A | 2/2000 | Chen |
| 6,041,347 A | 3/2000 | Harsham |
| 6,088,717 A | 7/2000 | Reed |
| 6,101,500 A | 8/2000 | Lau |
| 6,128,016 A | 10/2000 | Coelho |
| 6,131,118 A | 10/2000 | Stupek, Jr. |
| 6,134,581 A | 10/2000 | Ismael |
| 6,138,122 A | 10/2000 | Smith |
| 6,148,335 A | 11/2000 | Haggard |
| 6,166,732 A | 12/2000 | Mitchell |
| 6,167,448 A | 12/2000 | Hemphill |
| 6,175,866 B1 | 1/2001 | Holloway |
| 6,175,878 B1 | 1/2001 | Seaman |
| 6,260,050 B1 | 7/2001 | Yost |
| 6,263,457 B1 | 7/2001 | Anderson |
| 6,272,150 B1 | 8/2001 | Hrastar |
| 6,336,138 B1 | 1/2002 | Caswell |
| 6,363,421 B2 | 3/2002 | Barker |
| 6,393,386 B1 | 5/2002 | Zager |
| 6,397,245 B1 | 5/2002 | Johnson, II |
| 6,434,626 B1 | 8/2002 | Prakash |
| 6,438,592 B1 | 8/2002 | Killian |
| 6,456,306 B1 | 9/2002 | Chin |
| 6,466,932 B1 | 10/2002 | Dennis |
| 6,487,590 B1 | 11/2002 | Foley |
| 6,505,248 B1 | 1/2003 | Casper |
| 6,526,442 B1 | 2/2003 | Stupek, Jr. |
| 6,621,823 B1 | 9/2003 | Mellquist |
| 6,707,795 B1 | 3/2004 | Noorhosseini |
| 6,742,015 B1 | 5/2004 | Bowman-Amuah |
| 6,763,380 B1 | 7/2004 | Mayton |
| 6,816,898 B1 | 11/2004 | Scarpelli |
| 6,895,586 B1 | 5/2005 | Brasher |
| 6,948,175 B1 | 9/2005 | Fong |
| 6,985,901 B1 | 1/2006 | Sachse |
| 7,003,564 B2 | 2/2006 | Greuel |
| 7,028,228 B1 | 4/2006 | Lovy |
| 7,043,537 B1 | 5/2006 | Pratt |
| 7,043,661 B2 | 5/2006 | Valadarsky |
| 7,062,683 B2 | 6/2006 | Warpenburg |
| 7,096,459 B2 | 8/2006 | Keller |
| 7,146,574 B2 | 12/2006 | Goldthwaite |
| 7,197,466 B1 | 3/2007 | Peterson |
| 7,215,360 B2 | 5/2007 | Gupta |
| 7,216,304 B1 | 5/2007 | Gourdol |
| 7,222,147 B1 | 5/2007 | Black |
| 7,281,170 B2 | 10/2007 | Taylor |
| 7,412,502 B2 | 8/2008 | Fearn |
| 7,505,872 B2 | 3/2009 | Keller |
| 7,593,013 B2 | 9/2009 | Agutter |
| 7,596,716 B2 | 9/2009 | Frost |
| 7,617,073 B2 | 11/2009 | Trinon |
| 7,660,731 B2 | 2/2010 | Chaddha |
| 7,676,294 B2 | 3/2010 | Baier |
| 7,676,437 B2 | 3/2010 | Satkunanathan |
| 7,840,490 B1 | 11/2010 | Sellers |
| 7,877,783 B1 | 1/2011 | Cline |
| 7,890,869 B1 | 2/2011 | Mayer |
| 7,966,398 B2 | 6/2011 | Wiles, Jr. |
| 8,060,396 B1 | 11/2011 | Bessler |
| 8,196,210 B2 | 6/2012 | Sterin |
| 8,321,948 B2 | 11/2012 | Robinson |
| 8,407,669 B2 | 3/2013 | Yee |
| 8,554,750 B2 | 10/2013 | Rangarajan |
| 8,595,647 B2 | 11/2013 | Sabin |
| 8,620,818 B2 | 12/2013 | Hughes |
| 8,646,093 B2 | 2/2014 | Myers |
| 8,674,992 B2 | 3/2014 | Poston |
| 8,725,647 B2 | 5/2014 | Disciascio |
| 9,053,460 B2 | 6/2015 | Gilbert |
| 9,407,617 B2 | 8/2016 | Mowers |
| 9,560,036 B2 | 1/2017 | Hinton |
| 10,673,963 B1 | 6/2020 | Feiguine |
| 10,749,943 B1 | 8/2020 | Feiguine |
| 10,771,344 B2 | 9/2020 | Bitterfeld |
| 10,824,650 B2 | 11/2020 | Bar Oz |
| 10,911,431 B2 | 2/2021 | Leavy |
| 10,944,654 B2 | 3/2021 | Rimar |
| 10,999,152 B1 | 5/2021 | Bar Oz |
| 11,025,481 B1 | 6/2021 | Louca |
| 11,089,115 B2 | 8/2021 | Garty |
| 11,095,506 B1 | 8/2021 | Erblat |
| 11,275,580 B2 | 3/2022 | Tamir |
| 11,277,475 B1 | 3/2022 | Tal |
| 11,281,442 B1 | 3/2022 | Tal |
| 11,296,922 B2 | 4/2022 | Leibkowiz |
| 11,301,503 B2 | 4/2022 | Burli |
| 11,379,089 B2 | 7/2022 | Goswami |
| 11,418,329 B1 | 8/2022 | Miller |
| 11,451,573 B2 | 9/2022 | Waplington |
| 11,470,107 B2 | 10/2022 | Waplington |
| 11,632,303 B2 | 4/2023 | Bitterfeld |
| 11,640,369 B2 | 5/2023 | Bhogle |
| 2002/0116340 A1 | 8/2002 | Hellberg |
| 2002/0133584 A1 | 9/2002 | Greuel |
| 2002/0158969 A1 | 10/2002 | Gupta |
| 2003/0118087 A1 | 6/2003 | Goldthwaite |
| 2003/0200293 A1 | 10/2003 | Fearn |
| 2005/0015217 A1 | 1/2005 | Weidl |
| 2005/0091356 A1 | 4/2005 | Izzo |
| 2006/0026453 A1 | 2/2006 | Frost |
| 2006/0095461 A1 | 5/2006 | Raymond |
| 2006/0179058 A1 | 8/2006 | Bram |
| 2006/0293942 A1 | 12/2006 | Chaddha |
| 2007/0033279 A1 | 2/2007 | Battat |
| 2007/0188494 A1 | 8/2007 | Agutter |
| 2007/0288389 A1 | 12/2007 | Vaughan |
| 2008/0133289 A1 | 6/2008 | Armour |
| 2008/0148253 A1 | 6/2008 | Badwe |
| 2008/0319779 A1 | 12/2008 | Hughes |
| 2009/0088875 A1 | 4/2009 | Baier |
| 2009/0228984 A1 | 9/2009 | Sterin |
| 2009/0287936 A1 | 11/2009 | Ohkado |
| 2010/0110932 A1 | 5/2010 | Doran |
| 2015/0288719 A1 | 10/2015 | Freudiger |
| 2017/0180335 A1* | 6/2017 | Quinlan ............ H04L 63/0815 |
| 2018/0123940 A1 | 5/2018 | Rimar |
| 2018/0324159 A1* | 11/2018 | Koya ................. H04L 63/10 |
| 2019/0073257 A1 | 3/2019 | Dasgupta |
| 2019/0104398 A1 | 4/2019 | Owen |
| 2020/0050689 A1 | 2/2020 | Tal |
| 2020/0204443 A1 | 6/2020 | Bar Oz |
| 2020/0301678 A1 | 9/2020 | Burman |
| 2021/0194764 A1 | 6/2021 | Badyan |
| 2021/0288961 A1 | 9/2021 | Yedidi |
| 2022/0029886 A1 | 1/2022 | Hameiri |
| 2022/0231848 A1* | 7/2022 | Zhang ................ H04L 9/0822 |

FOREIGN PATENT DOCUMENTS

| | | |
|---|---|---|
| WO | 9934285 W | 7/1999 |
| WO | 0052559 W | 9/2000 |
| WO | 0179970 W | 10/2001 |
| WO | 20140209075 A1 | 12/2014 |
| WO | 2019233833 A1 | 12/2019 |

OTHER PUBLICATIONS

ServiceNow, Utah Now Platform Capabilities, Jun. 30, 2023.
ServiceNow, Utah Platform Security, Jun. 30, 2023.

(56) References Cited

OTHER PUBLICATIONS

International Search Report and Written Opinion, PCT Application PCT/US2024/034020, mailed Oct. 7, 2024.

* cited by examiner

CLIENT-SIDE SHARING OF CRYPTOGRAPHIC KEYS

BACKGROUND

Proxy servers are currently used to facilitate discovery and other procedures in managed networks. These procedures often require that the proxy servers have access to credentials in order to log on to or otherwise obtain information from computing devices on a managed network or in public cloud infrastructure used by the managed network. These credentials may be one or more of userid/password pairs, one time passwords, certificates, application programming interface (API) keys, tokens, and so on. The credentials are commonly stored in an encrypted format either in a computational instance of a remote network management platform or in a separate online security vault. Associations between credentials and the proxy servers that use these credentials are configured per proxy server, producing inefficiencies as the number of proxy servers per managed network grows.

SUMMARY

Various implementations disclosed herein include techniques for sharing access to credentials across proxy servers. A proxy server may be configured to be one of a set of one or more proxy servers with access to the credentials. A new proxy server may be added to this set, or a new shared credential may be configured. A goal is to make the credentials available to all proxy servers in the set in a way that is efficient, secure, and does not expose any of the credentials or an encryption key used to secure the credentials to a third party.

Accordingly, a first example embodiment may involve determining that a first proxy server is to share security credentials with a set of one or more proxy servers, wherein the set of one or more proxy servers is associated with the security credentials, and wherein the set of one or more proxy servers includes a second proxy server; transmitting, to the second proxy server, a request for the first proxy server to have access to the security credentials; and receiving, from the second proxy server, a credential key in an encrypted form, wherein the credential key is configured to decrypt the security credentials.

A second example embodiment may involve: receiving a request for a first proxy server to have access to security credentials, wherein the request is received by a second proxy server that is in a set of one or more proxy servers; validating that the first proxy server is a member of the set and has proper authorization to access the security credentials; encrypting a credential key into an encrypted form; and transmitting, to a location that is accessible by the first proxy server, the credential key in the encrypted form.

A third example embodiment may involve a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
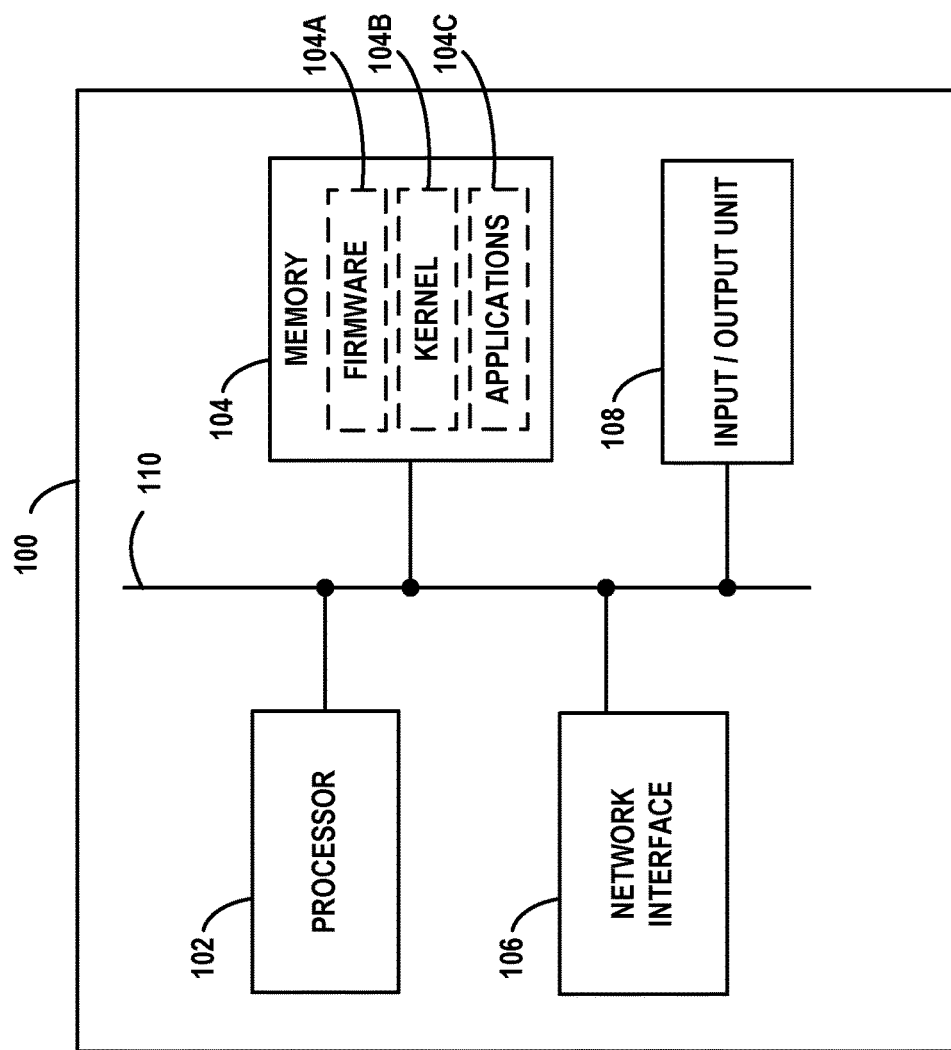
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
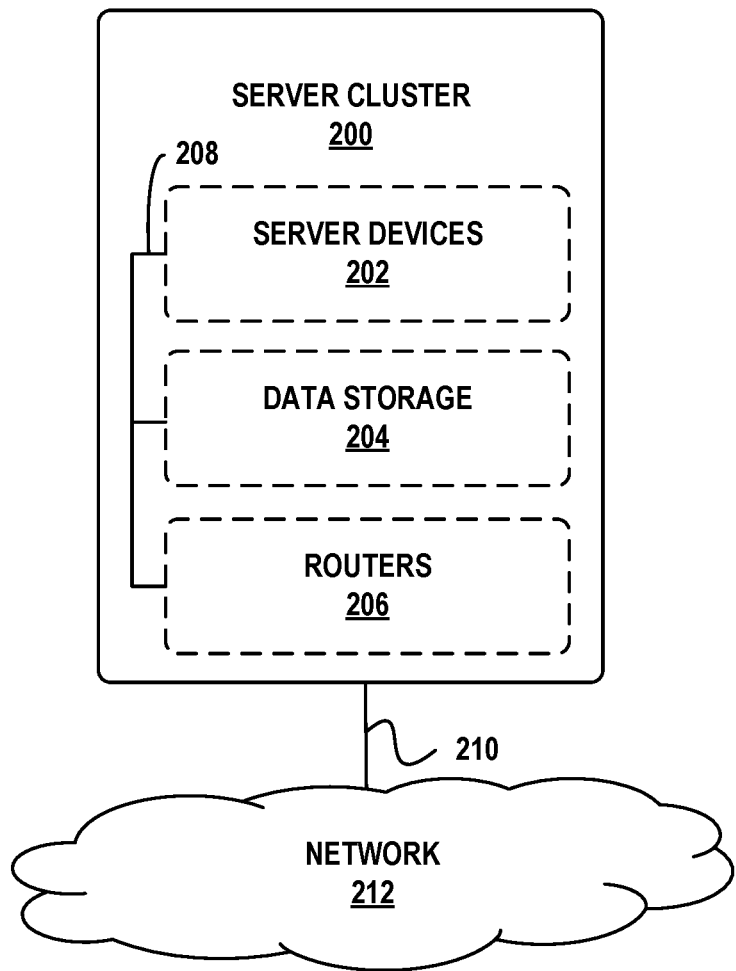
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the extensible Markup Language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
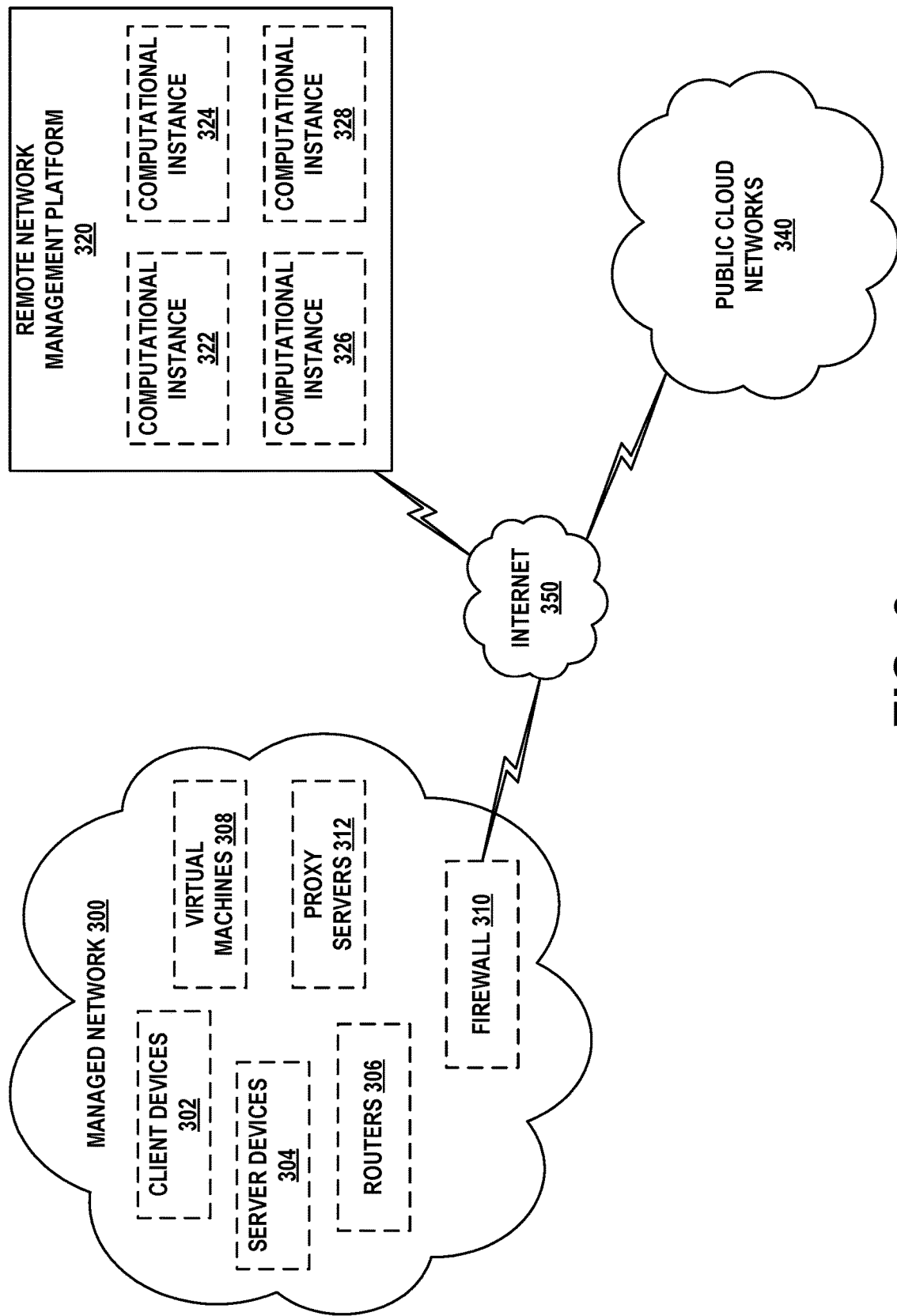
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include Amazon AWS Cloud, Microsoft Azure Cloud (Azure), Google Cloud Platform (GCP), and IBM Cloud Platform. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
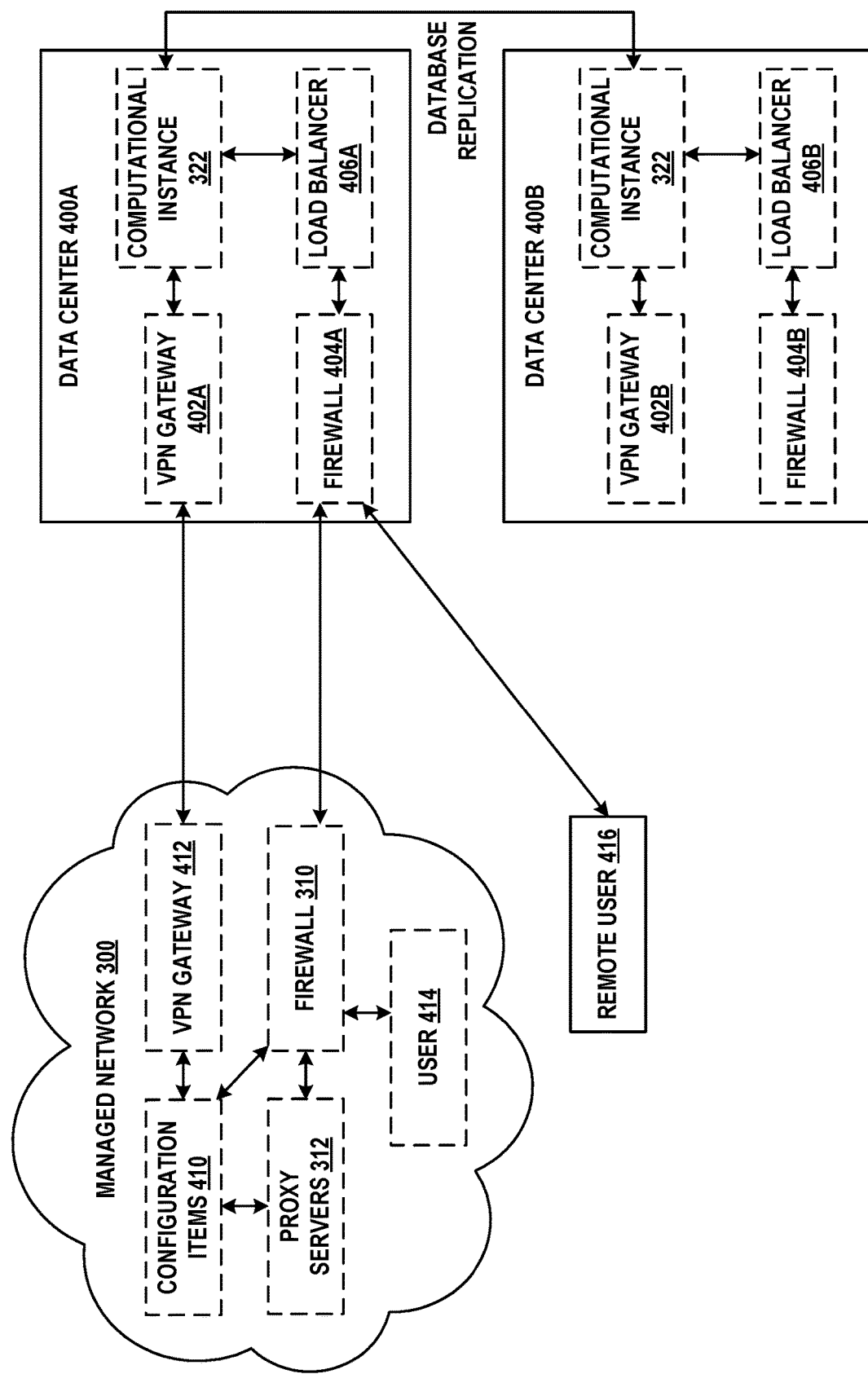
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

IV. Example Discovery

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of each device, component, application, and service may be referred to as a configuration item. The process of determining the configuration items and relationships within managed network 300 is referred to as discovery, and may be facilitated at least in part by proxy servers 312. Representations of configuration items and relationships are stored in a CMDB.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
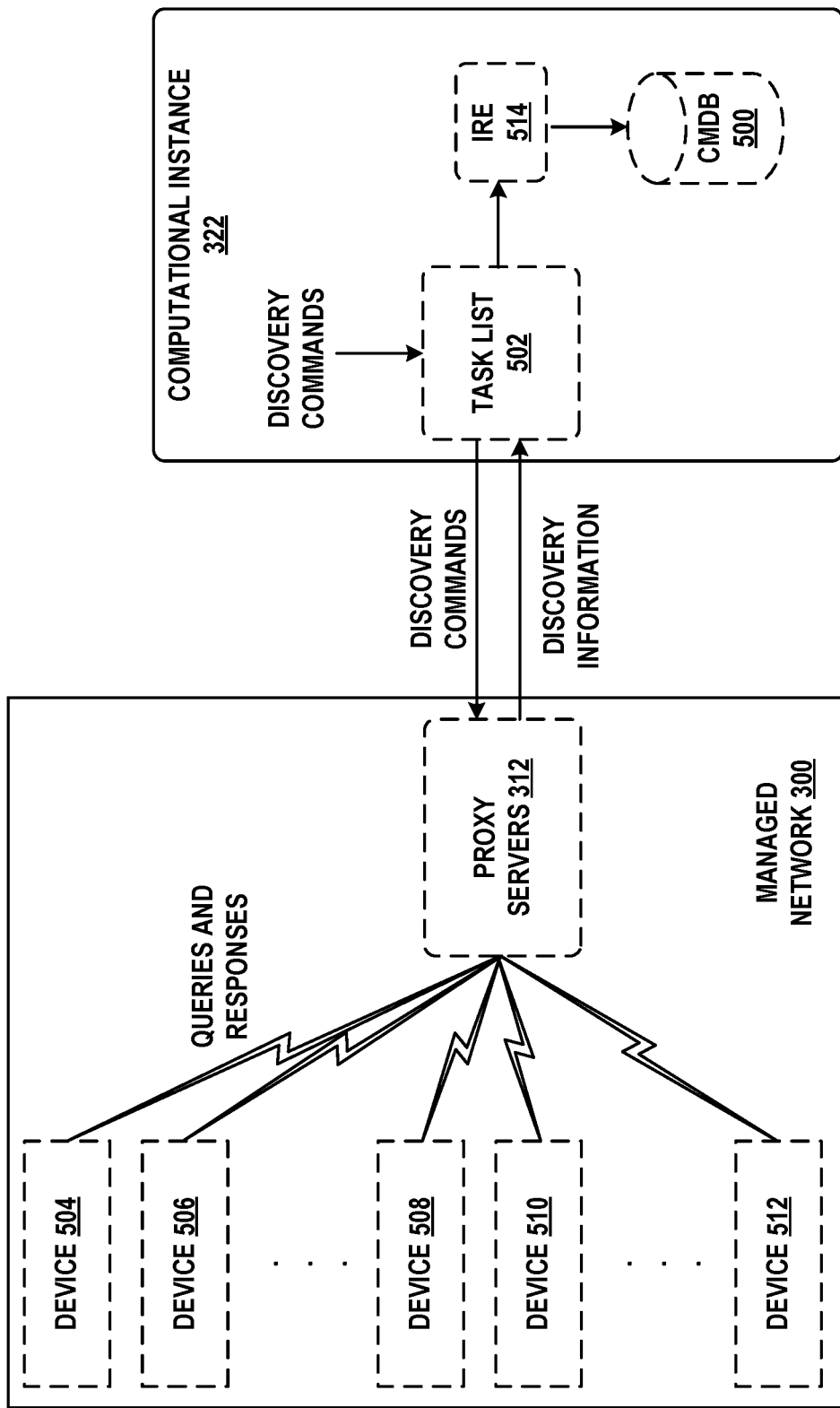
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery-horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases—under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices-for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

V. CMDB Identification Rules and Reconciliation

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VI. Proxy Server Use and Key Management

As noted above, proxy servers 312 may store and/or have access to credentials for devices to be discovered. Here, credentials may include any type of information needed in order to access the devices. These may include userid/password pairs, one time passwords, certificates, API keys, tokens, and so on. In general, the terms "credentials", "security credentials", "keys", and "secrets" may be used interchangeably herein to refer to one or more of these types of information.

In some implementations, credentials may be stored in proxy servers 312. In other implementations, credentials may be stored in encrypted fields of one or more tables within CMDB 500 or as encrypted data in an external security vault (e.g., a server device on managed network 300 or otherwise accessible to proxy servers 312). In these deployments, proxy servers 312 may contain a credential key for the credentials so that proxy servers 312 can request the encrypted credentials and use these credentials to log on to or otherwise access devices being discovered on managed network 300 or public cloud network 340. Notably, the entities that operate CMDB 500 and/or the external security vault cannot view the unencrypted credentials because they do not have access to the credential key. In some cases, these entities may have access to an encrypted version of the credential key but will be unable to derive the credential key therefrom.

The credential key may be a symmetric key, in that it can only decrypt credentials that were encrypted using the same key. On the other hand, the credential key may be of an asymmetric key, e.g., the credential key is a private key of a public/private key pair. In this latter case, the credential key can be used to decrypt credentials that were encrypted with the associated public key (e.g., the private and public keys are mathematically related such that this can happen in a secure manner).

This arrangement enhances security, as it involves a zero-trust framework. From the perspective of managed network 300, the entities that operate CMDB 500 and/or the external security vault transparently store encrypted credentials, which are delivered to proxy servers 312 on demand. Only a proxy server 312 with the proper credential key can decrypt and use the credentials. This prevents the entities that operate CMDB 500 and/or the external security vault from having knowledge of userid/password pairs, one time passwords, certificates, API keys, tokens, and so on that are used internal to managed network 300 or by managed network 300 to access public cloud network 340.

Thus, there is a mapping between encrypted credentials and the proxy servers 312 that are permitted to request and receive these credentials (e.g., from CMDB 500 and/or an external security vault). If such a proxy server is configured with the correct credential keys, it can then decrypt the encrypted credentials and use the resulting plaintext version of the credentials to access devices on managed network 300 or public cloud network 340.

Throughout the discussion herein, the term "proxy server" may refer to what is commonly called a management, instrumentation, and discovery server, or MID server. As noted above, a proxy server facilitates communication and data exchange between a computational instance and external systems or resources located in a managed network or on-premises environment. The proxy server allows the computational instance to interact with devices, applications, databases, and other systems that might not by directly accessible from the public Internet.

Figure 6:
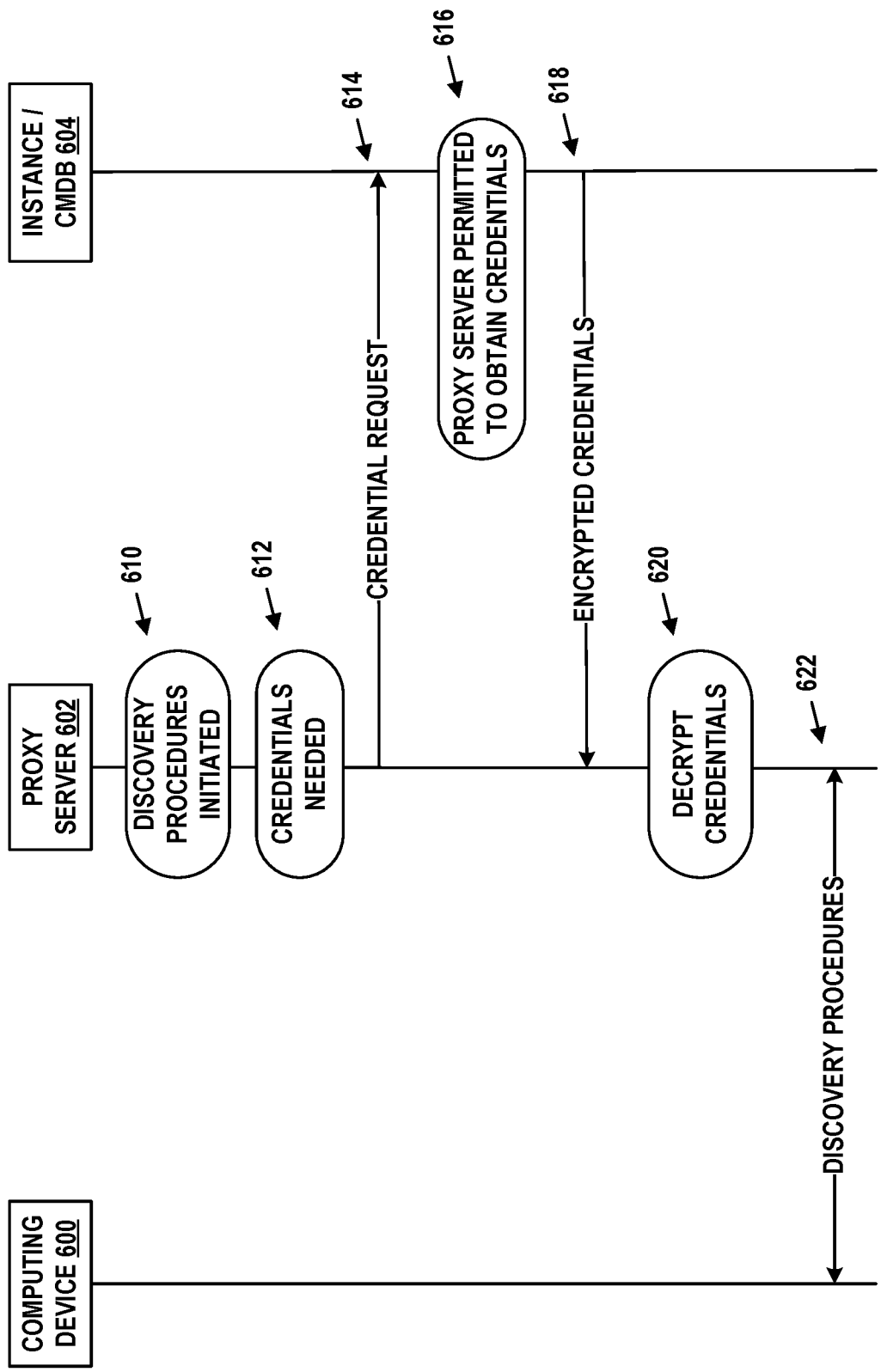
FIG. 6 depicts a credential management transaction, in accordance with example embodiments.

FIG. 6 depicts an example of a credential management transaction. The transaction involves proxy server 602 (e.g., deployed within managed network 300), instance/CMDB 604 (e.g., deployed within remote network management platform 320), and computing device 600. It is assumed for sake of simplicity and without loss of generality that there is just one of proxy server 602 in this transaction. Also, computing device 600 may be disposed within managed network 300 or public cloud network 340, and is assumed to be the target of discovery or other procedures.

At step 610, discovery procedures are initiated. This may occur due to proxy server 602 receiving a command from remote network management platform 320 or in some other manner. For example, step 610 may be initiated by receiving a message or command from instance/CMDB 604.

At step 612, proxy server 602 may determine that credentials are needed from instance/CMDB 604. For example, proxy server 602 may determine that it needs credentials to access computing device 600 based on the contents of the command.

At step 614, proxy server 602 may transmit a credential request to instance/CMDB 604. This credential request may identify the credentials needed, e.g., by specifying a network address or another identifier of computing device 600.

At step 616, instance/CMDB 604 may determine that proxy server 602 is permitted to obtain the credentials. As noted, access to some credentials may be limited to certain proxy servers.

At step 618, instance/CMDB 604 may transmit the requested credentials in encrypted form to proxy server 602. Notably, instance/CMDB 604 might not have access to the requested credentials in any unencrypted form.

At step 620, proxy server 602 may decrypt the encrypted credentials using the appropriate credential key. There may be more than one credential key configured on proxy server 602, and the key that is used may be identified, e.g., by the network address or another identifier of computing device 600.

At step 622, discovery procedures are carried out between proxy server 602 and computing device 600 using the credentials as decrypted. These procedures may involve multiple steps, at least some of which employ the credentials to access computing device 600, such as probing the port numbers of device 600 and/or remotely logging on to this device. Alternatively or additionally, other non-discovery procedures may be carried out.

As managed networks may be geographically dispersed and contain millions of computing devices, software applications, and other objects that are discoverable as configuration items, these managed networks can employ tens, hundreds, or thousands of proxy servers. Each proxy server must be capable of obtaining the credentials it needs to carry out whatever procedures (discovery or otherwise) that it is commanded to perform. In other words, instance/CMDB 604 should be configured with which proxy servers can access which credentials. But such associations between credentials and the proxy servers that use these credentials are currently configured per proxy server, creating a massive amount of inefficiency as the number of proxy servers per managed network grows.

Particularly, managed networks may desire to group sets of two or more proxy servers for purposes of performance, load balancing, and redundancy, for example. These sets may be configured based on geography (e.g., all proxy servers of a set are in the same general location) or the type of computing devices or services that are expected to be accessed by the proxy servers (e.g., the same general location may contain multiple sets of proxy servers for different functions). Thus, it would be advantageous to be able to share permissions to access credentials (and the credentials themselves) across more than one proxy server in a manner that is efficient and scalable, but with little configuration overhead. For instance, such a set may be configured as a list of unique identifiers of the constituent proxy servers (e.g., their network addresses) associated indications of the appropriate credentials.

Figure 7:
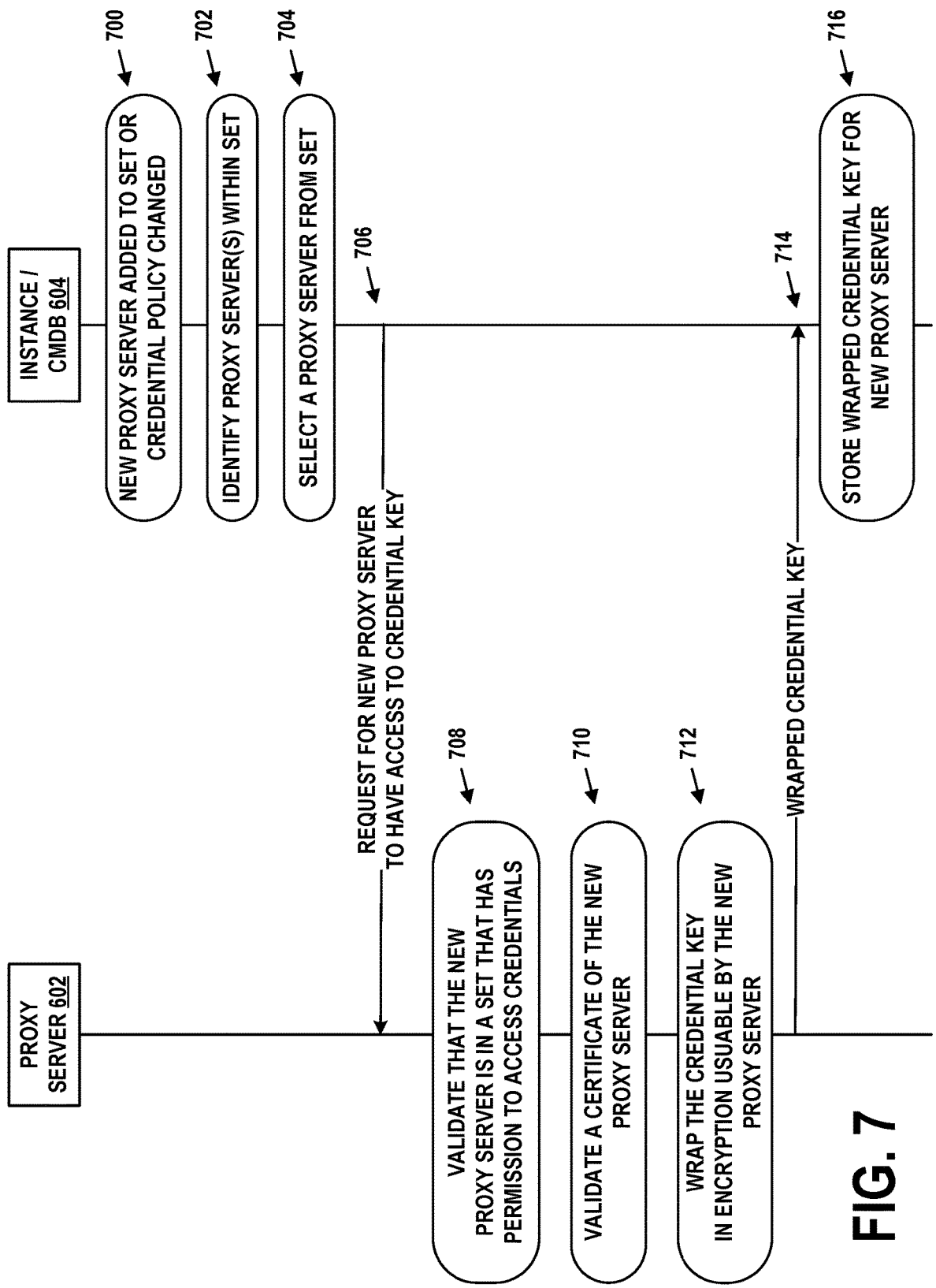
FIG. 7 is a flow chart that represents sharing access to credentials across proxy servers, in accordance with example embodiments.

FIG. 7 provides a flow chart that represents sharing access to credentials across proxy servers. Here, it is assumed that proxy server 602 is configured to be one of a set of one or more proxy servers with access to certain credentials, and that a new proxy server is being added to this set. A goal is to do so in a way that is efficient, secure, and does not expose any of the credentials or the credential key to instance/CMDB 604.

At step 700, instance/CMDB 604 may determine that the new proxy server is to be added to the set or that some credential policy has changed for the set. This may be due to manual configuration on instance/CMDB 604, a scheduled rekeying procedure, or based on other reasons.

At step 702, instance/CMDB 604 may identify the proxy servers within this set. There may be one or more such proxy servers.

At step 704, instance/CMDB 604 may select a proxy server from this set. While any proxy server in the set can be selected, for purposes of simplicity it is assumed that proxy server 602 is selected. This selection could be done randomly or based on some pre-established ordering of the proxy servers.

At step 706, instance/CMDB 604 may transmit a request, to proxy server 602, for the new proxy server to have access to the credential key.

At step 708, proxy server 602 may validate that the new proxy server is in the set that has permission to access the credentials. This implies that proxy server 602 is configured with or has access to a list of proxy servers in the set.

At step 710, proxy server 602 may validate a certificate of the new proxy server. This step verifies the identity of new proxy server and avoids giving unknown or rogue proxy servers access to credentials.

At step 712, proxy server 602 may wrap the credential key in another layer of encryption (e.g., another layer of symmetric or asymmetric encryption). This encryption should be usable by the new proxy server (e.g., the credential key is encrypted using the public key of the new proxy server such that a private key of the new proxy server can decrypt the credential key).

At step 714, proxy server 602 may transmit the wrapped credential key to instance/CMDB 604.

At step 716, instance/CMDB 604 may store the wrapped credential key so that it is associated with the new proxy server. Then, at some later point in time, the new proxy server can request and receive the wrapped credential key, decrypt it, and store it locally for at least some time. The new proxy server may use the credential key in a transaction similar to that of FIG. 6 in order to obtain the credentials.

The transmissions between proxy server 602 and instance/CMDB 604 may take various forms, such as XML, JavaScript Object Notation (JSON), plain text, binary-encoded values, and so on. These interfaces between proxy server 602 and instance/CMDB 604 could be based on, for example representational state transfer (REST), simple object access protocol (SOAP), websockets, etc. Any of these transmissions may be encrypted and/or authenticated, e.g., by way of TLS, a VPN, and so on.

As noted above, the term "wrap" is used herein to indicate that a unit of information (e.g., a credential) is encrypted. Thus, a "wrapped credential" is a credential that has been encrypted and cannot be obtained in plaintext form without access to a cryptographic decryption key, such as a credential key.

In some implementations, instance/CMDB 604 is configured to support a dedicated credential key per each proxy server. However, if multiple proxy servers are grouped together in a set and have the same or similar functions (e.g., discovery of configuration items on a particular segment of a managed network), it can be beneficial to configure instance/CMDB 604 to support a more flexible approach. This flexible approach has been assumed in the discussion above (e.g., FIGS. 6 and 7), but is defined more explicitly below.

Figure 8:
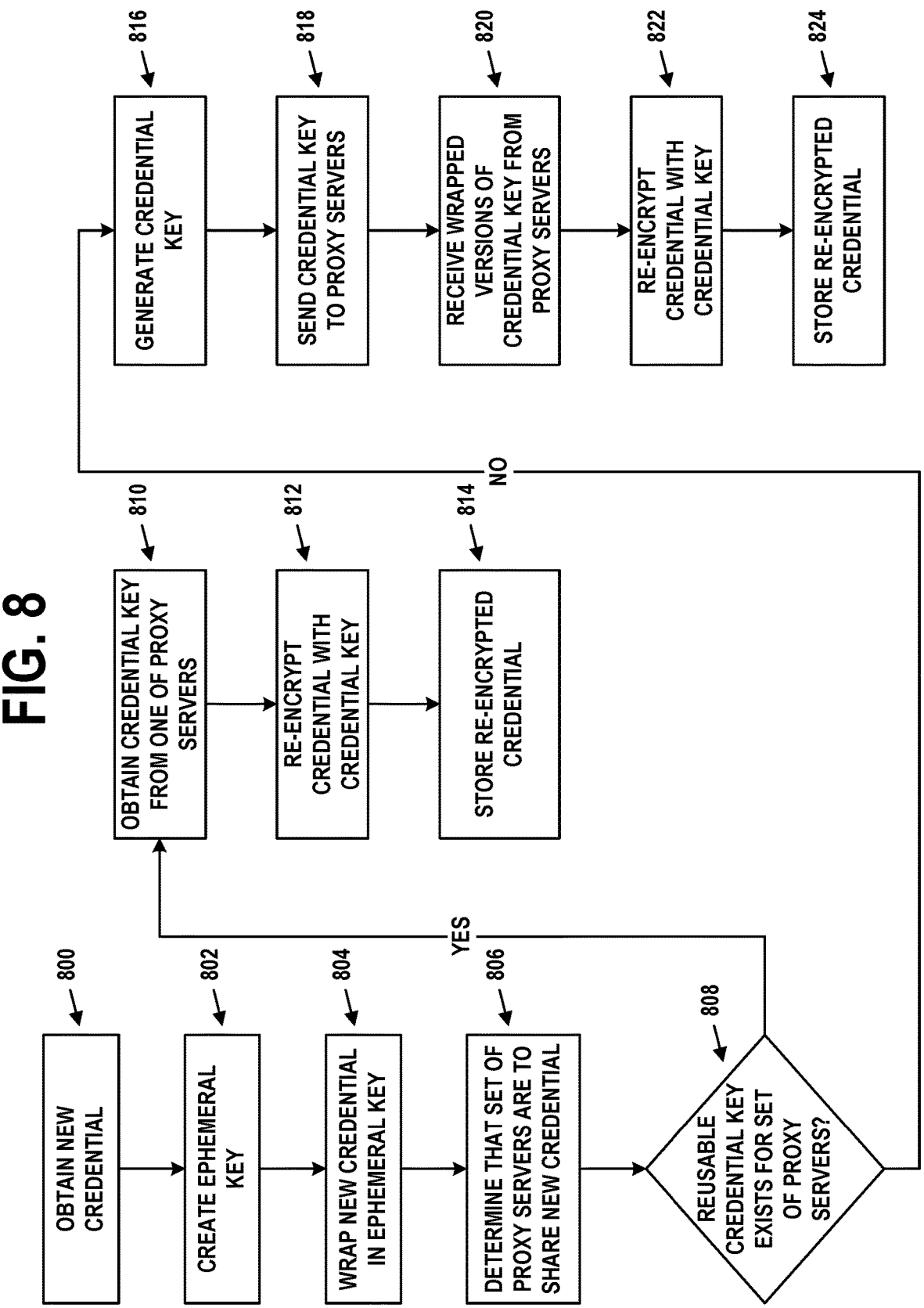
FIG. 8 is a flow chart for sharing credentials and generating and sharing associated credential keys, in accordance with example embodiments.

FIG. 8 is a flow chart for generating and sharing credentials and associated credential keys. This flow chart depicts two scenarios-one in which a reusable credential key already exists for a set of proxy servers, and another in which such a reusable credential key does not exist for the set of proxy servers. Both of these scenarios are discussed from the point of view of an instance/CMDB.

At step 800, a new credential is obtained. This credential may be manually entered into the instance/CMDB, for example.

At step 802, the instance/CMDB may create an ephemeral key with which to encrypt the credential. Ephemeral keys can be used to provide temporary encryption of credentials. They are typically generated for short-lived purposes and then discarded once the purpose has been fulfilled. Ephemeral keys can enhance security by reducing the risk of key compromise and ensuring forward secrecy, which means that even if an ephemeral key is compromised in the future, it cannot be used to decrypt the credential once the credential is re-keyed (e.g., re-encrypted with a different key).

At step 804, the instance/CMDB may wrap (encrypt) the new credential using the ephemeral key.

At step 806, the instance/CMDB may determine that the set of proxy servers are to share the new credential.

At step 808, the instance/CMDB may determine whether a reusable credential key exists for the set of proxy servers. For example, the credential key may have already been established for these proxy servers by way of prior configuration. If such a credential key exists, then steps 810, 812, and 814 are carried out.

At step 810, the instance/CMDB may obtain the credential key from any one of the proxy servers that has a copy of this key. At noted in the discussion of FIG. 7, at least one proxy server of the set will have a copy of the credential key.

At step 812, the instance/CMDB may use the credential key to re-encrypt (re-key) the credential. This may involve first decrypting the credential using the ephemeral key. After this, the ephemeral key may be deleted.

At step 814, the instance/CMDB may store the re-encrypted credential (e.g. in a table of the CMDB or another database).

If the instance/CMDB determines that a credential key not exist at step 808, then steps 816, 818, 820, 822, and 824 are carried out.

At step 816, the instance/CMDB may generate a credential key. Such a key can be generated using random number generators (RNGs) or pseudo-random number generators (PRNGs). These generators produce a sequence of seemingly random numbers based on an initial seed value. The generated key is usually a fixed length required by the encryption procedure. For asymmetric encryption procedures, such as RSA (Rivest-Shamir-Adleman), specific techniques can be used to select a pair of prime numbers and derive mathematically linked public and private keys.

At step 818, the instance/CMDB may send the generated credential key to the proxy servers. Doing so may involve wrapping the credential key in another layer of encryption that can be decrypted by the proxy servers.

At step 820, the instance/CMDB may receive wrapped versions of the credential key from each of the proxy servers. These wrapped versions may be encrypted differently by each of the proxy servers.

Steps 822 and 824 are similar in function to steps 812 and 814. Additionally, the instance/CMDB may re-encrypt other (previously configured) shared credentials for the proxy servers using the credential key.

To the extent that a plaintext version of any of the credentials or keys are used by any computing device herein, these objects may be maintained in plaintext only on an as-needed basis, and deleted when they are no longer needed or after some fixed period of time. Further, such plaintext versions may be stored only in volatile storage (e.g., RAM) and not persisted to non-volatile storage. Doing so reduces the likelihood that the credentials or keys can be compromised or accidentally disclosed.

VII. Example Technical Improvements

These embodiments provide a technical solution to a technical problem. One technical problem being solved is secure distribution of shared credentials between multiple client-side devices (e.g., proxy servers). In practice, this is problematic because such client-side devices are numerous and can be grouped into sets have the same or similar functions. Having dedicated credentials for each proxy server requires a significant amount of memory for storage of these credentials. Prior art techniques did little if anything to address these problems, leading to wasted storage capacity and increased system complexity.

The embodiments herein overcome these limitations by providing mechanisms for securely assigning and distributing access to shared credentials between a set of two or more proxy servers. This results in several advantages. First, less memory is required for credential storage, as the number of credentials can be decreased by an order of magnitude in at least some situations. Second, proxy servers can easily be added to a set with minimal configuration overhead. Third, encrypted credentials can be efficiently re-keyed when new shared credentials are introduced. Fourth, all of this can happen in a zero-trust manner, with no access to unencrypted credentials even when they are stored on a remote server (e.g., in an instance/CMDB of a remote network management platform).

Other technical improvements may also flow from these embodiments, and other technical problems may be solved. Thus, this statement of technical improvements is not limiting and instead constitutes examples of advantages that can be realized from the embodiments.

VIII. Example Operations

Figure 9:
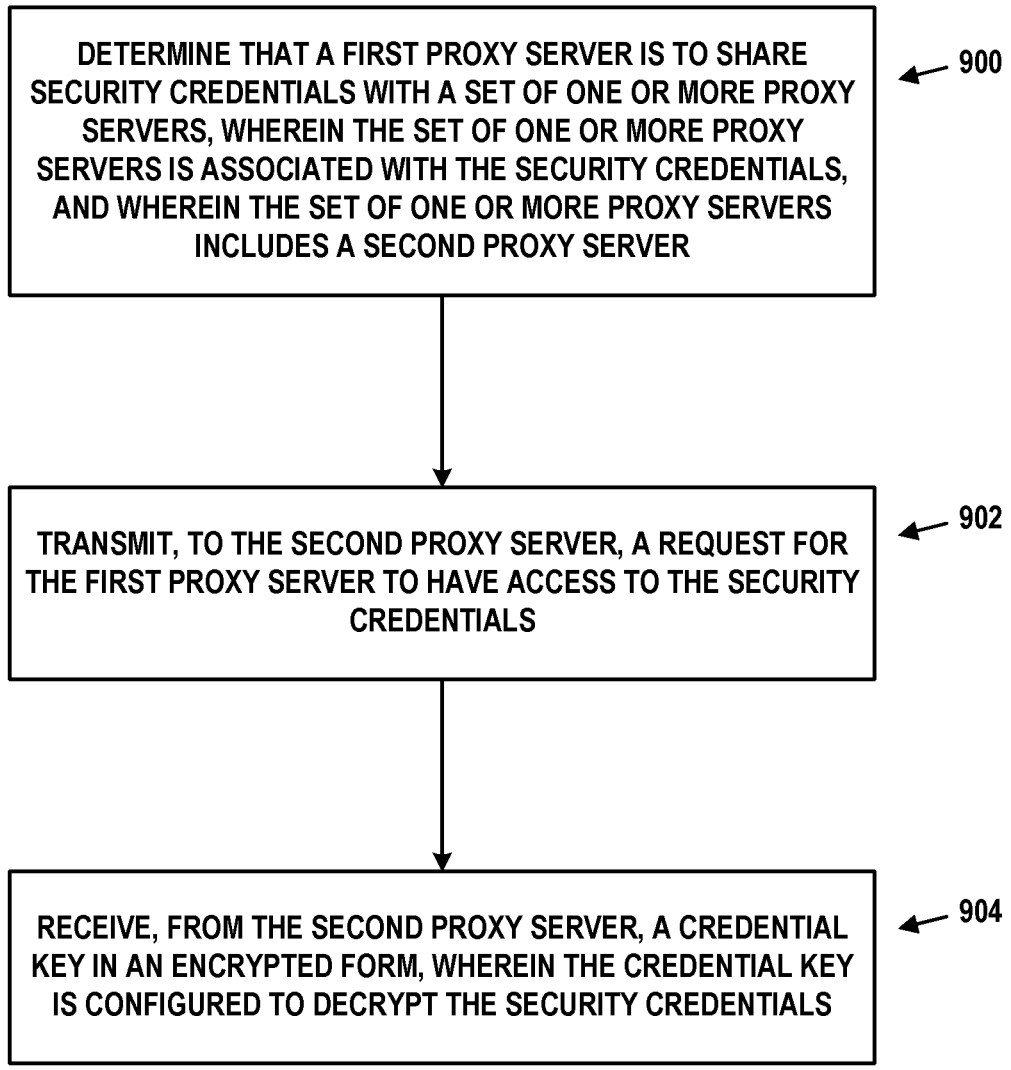
FIG. 9 is a flow chart, in accordance with example embodiments.
Figure 10:
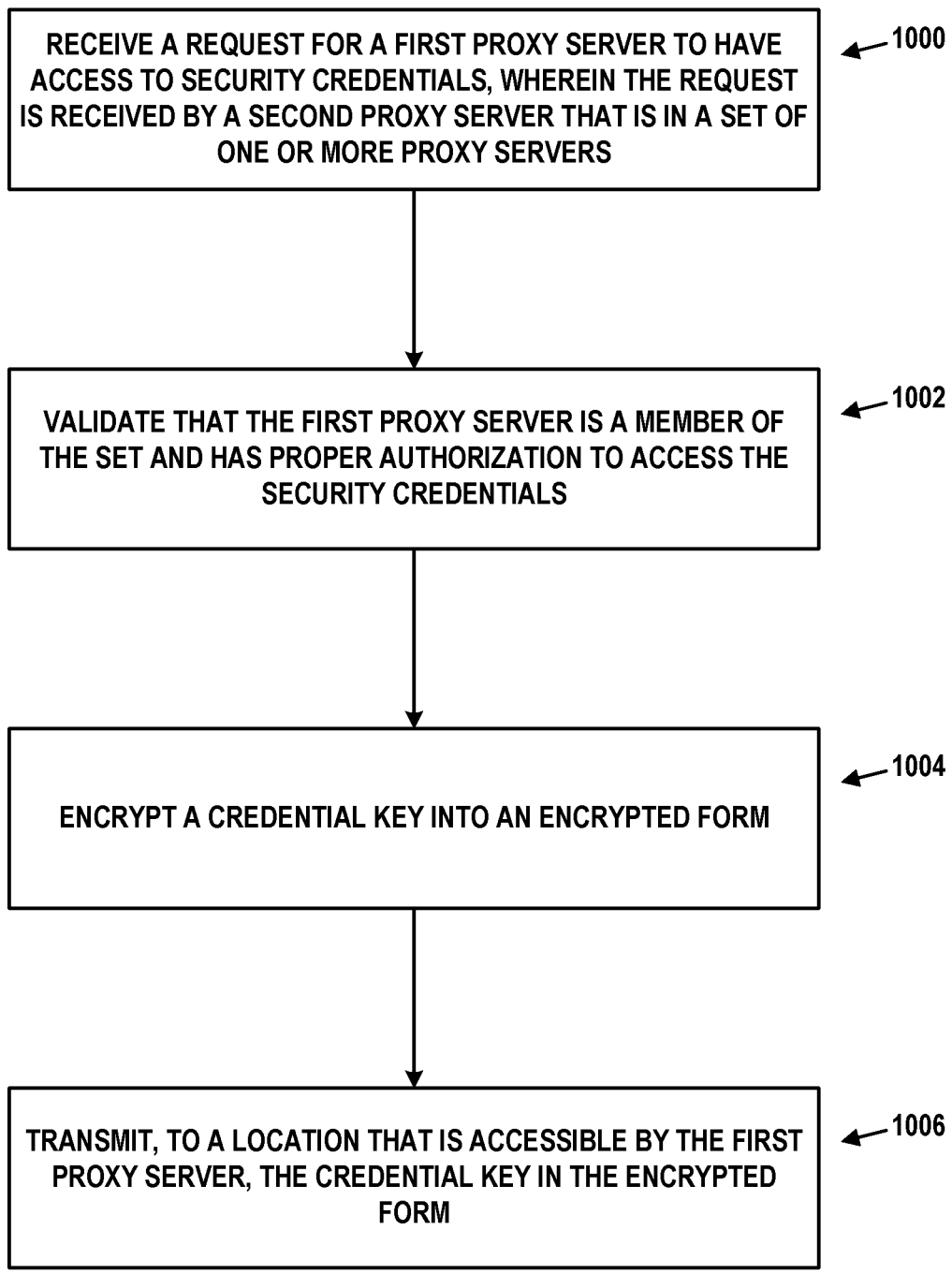
FIG. 10 is a flow chart, in accordance with example embodiments.

FIGS. 9 and 10 are flow charts illustrating example embodiments. The processes illustrated by FIGS. 9 and 10 may be carried out by a computing device, such as computing device 100, and/or a cluster of computing devices, such as server cluster 200. However, the processes can be carried out by other types of devices or device subsystems. For example, the processes could be carried out by a proxy server, a computational instance of a remote network management platform or a portable computer, such as a laptop or a tablet device.

The embodiments of FIGS. 9 and 10 may be simplified by the removal of any one or more of the features shown therein. Further, these embodiments may be combined with features, aspects, and/or implementations of any of the previous figures or otherwise described herein. The embodiment of FIG. 9 may be performed by a computational instance of a remote network management platform, and the embodiment of FIG. 10 may be performed by a proxy server. But other possibilities exist.

Block 900 of FIG. 9 may involve determining that a first proxy server is to share security credentials with a set of one or more proxy servers, wherein the set of one or more proxy servers is associated with the security credentials, and wherein the set of one or more proxy servers includes a second proxy server.

Block 902 may involve transmitting, to the second proxy server, a request for the first proxy server to have access to the security credentials.

Block 904 may involve receiving, from the second proxy server, a credential key in an encrypted form, wherein the credential key is configured to decrypt the security credentials.

Some examples may further involve: receiving, from the first proxy server, a request for the credential key; and transmitting, to the first proxy server, the credential key in the encrypted form.

Some examples may further involve: receiving, from the first proxy server, a request for the security credentials; and transmitting, to the first proxy server, the security credentials in an encrypted form.

In some examples, the first proxy server is disposed upon a managed network, wherein the first proxy server is configured to: decrypt the security credentials using the credential key; and use the security credentials to remotely access computing devices on the managed network.

In some examples, the set of one or more proxy servers is represented by a list of their respective unique identifiers, wherein determining that the first proxy server is to share the security credentials with the set of one or more proxy servers comprises determining that a unique identifier of the first proxy server has been added to the list.

In some examples, determining that the first proxy server is to share the security credentials with the set of one or more proxy servers comprises determining that the security credentials have been newly configured for the set of one or more proxy servers.

Some examples may further involve, prior to determining that the first proxy server is to share the security credentials with the set of one or more proxy servers: generating an ephemeral key, encrypting the security credentials with the ephemeral key, and storing the security credentials as encrypted.

Some examples may further involve: determining that the credential key exists; obtaining the credential key from a proxy server of the set of one or more proxy servers; decrypting the security credentials with the ephemeral key; and re-encrypting the security credentials with the credential key.

Some examples may further involve: determining that the credential key does not yet exist; generating the credential key; transmitting the credential key to a proxy server of the set of one or more proxy servers; receiving the credential key in the encrypted form from the proxy server; decrypting the security credentials with the ephemeral key; and re-encrypting the security credentials with the credential key.

Some examples may further involve: prior to transmitting the request, identifying the second proxy server from the set of one or more proxy servers based on random selection or an ordering of the set of one or more proxy servers.

In some examples, a server device: stores the security credentials in the encrypted form, transmits the request to the second proxy server, receives the credential key in the encrypted form from the second proxy server, and stores the credential key in the encrypted form.

Some examples may further involve: determining that a third proxy server is to share the security credentials with the set of one or more proxy servers, wherein the set of one or more proxy servers includes a fourth proxy server; transmitting, to the fourth proxy server, a request for the third proxy server to have access to the security credentials; and receiving, from the fourth proxy server, the credential key in the encrypted form.

In some examples, the credential key is a symmetric or asymmetric cryptographic key.

Block 1000 of FIG. 10 may involve receiving a request for a first proxy server to have access to security credentials, wherein the request is received by a second proxy server that is in a set of one or more proxy servers.

Block 1002 may involve validating that the first proxy server is a member of the set and has proper authorization to access the security credentials.

Block 1004 may involve encrypting a credential key into an encrypted form.

Block 1006 may involve transmitting, to a location that is accessible by the first proxy server, the credential key in the encrypted form.

In some examples, the first proxy server and the second proxy server are disposed upon a managed network, wherein the first proxy server receives the request from a computing device that is not disposed upon the managed network, and wherein the first proxy server transmits the credential key in the encrypted form to the computing device.

In some examples, the set of one or more proxy servers are represented by a list of their respective unique identifiers, and wherein the request for the first proxy server to have access to the security credentials is based on determining that a unique identifier of the first proxy server has been added to the list.

In some examples, the request for the first proxy server to have access to the security credentials is based on determining that the security credentials have been newly configured for the set of one or more proxy servers.

Some examples may further involve: transmitting, by the first proxy server, a request for the credential key; and receiving, by the first proxy server, the credential key in the encrypted form; transmitting, by the first proxy server, a request for the security credentials; and receiving, by the first proxy server, the security credentials in the encrypted form.

In some examples, the first proxy server is disposed upon a managed network. These examples may involve: decrypting, by the first proxy server, the security credentials using the credential key; and using, by the first proxy server, the security credentials to remotely access computing devices on the managed network.

IX. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
   determining that a first proxy server is to share security credentials with a set of one or more proxy servers when a unique identifier of the first proxy server has been added to a list, wherein the set of one or more proxy servers is represented by the list of their respective unique identifiers and is associated with the security credentials, and wherein the set of one or more proxy servers includes a second proxy server;
   transmitting, to the second proxy server, a request for the first proxy server to have access to the security credentials; and
   receiving, from the second proxy server, a credential key in an encrypted form, wherein the credential key is configured to decrypt the security credentials.

2. The method of claim 1, further comprising:
receiving, from the first proxy server, a request for the credential key; and
transmitting, to the first proxy server, the credential key in the encrypted form.

3. The method of claim 1, further comprising:
receiving, from the first proxy server, a request for the security credentials; and
transmitting, to the first proxy server, the security credentials in the encrypted form.

4. The method of claim 3, wherein the first proxy server is disposed upon a managed network, and wherein the first proxy server is configured to:
decrypt the security credentials using the credential key; and
use the security credentials to remotely access computing devices on the managed network.

5. The method of claim 1, wherein determining that the first proxy server is to share the security credentials with the set of one or more proxy servers comprises determining that the security credentials have been newly configured for the set of one or more proxy servers.

6. The method of claim 5, further comprising, prior to determining that the first proxy server is to share the security credentials with the set of one or more proxy servers:
generating an ephemeral key, encrypting the security credentials with the ephemeral key, and storing the security credentials as encrypted.

7. The method of claim 6, further comprising:
determining that the credential key exists;
obtaining the credential key from a proxy server of the set of one or more proxy servers;
decrypting the security credentials with the ephemeral key; and
re-encrypting the security credentials with the credential key.

8. The method of claim 6, further comprising:
determining that the credential key does not yet exist;
generating the credential key;
transmitting the credential key to a proxy server of the set of one or more proxy servers;
receiving the credential key in the encrypted form from the proxy server;
decrypting the security credentials with the ephemeral key; and
re-encrypting the security credentials with the credential key.

9. The method of claim 1, further comprising:
prior to transmitting the request, identifying the second proxy server from the set of one or more proxy servers based on random selection or an ordering of the set of one or more proxy servers.

10. The method of claim 1, wherein a server device:
stores the security credentials in the encrypted form,
transmits the request to the second proxy server,
receives the credential key in the encrypted form from the second proxy server, and
stores the credential key in the encrypted form.

11. The method of claim 1, further comprising:
determining that a third proxy server is to share the security credentials with the set of one or more proxy servers, wherein the set of one or more proxy servers includes a fourth proxy server;
transmitting, to the fourth proxy server, a request for the third proxy server to have access to the security credentials; and
receiving, from the fourth proxy server, the credential key in the encrypted form.

12. The method of claim 1, wherein the credential key is a symmetric or asymmetric cryptographic key.

13. A method comprising:
receiving a request for a first proxy server to have access to security credentials when a unique identifier of the first proxy server has been added to a list, wherein the request is received by a second proxy server that is in a set of one or more proxy servers represented by the list of their respective unique identifiers;
validating that the first proxy server is a member of the set and has proper authorization to access the security credentials;
encrypting a credential key into an encrypted form; and
transmitting, to a location that is accessible by the first proxy server, the credential key in the encrypted form.

14. The method of claim 13, wherein the first proxy server and the second proxy server are disposed upon a managed network, wherein the first proxy server receives the request from a computing device that is not disposed upon the managed network, and wherein the first proxy server transmits the credential key in the encrypted form to the computing device.

15. The method of claim 13, wherein the request for the first proxy server to have access to the security credentials is based on determining that the security credentials have been newly configured for the set of one or more proxy servers.

16. The method of claim 13, further comprising:
transmitting, by the first proxy server, a request for the credential key;
receiving, by the first proxy server, the credential key in the encrypted form;
transmitting, by the first proxy server, a request for the security credentials; and
receiving, by the first proxy server, the security credentials in the encrypted form.

17. The method of claim 16, wherein the first proxy server is disposed upon a managed network, the method further comprising:
decrypting, by the first proxy server, the security credentials using the credential key; and
using, by the first proxy server, the security credentials to remotely access computing devices on the managed network.

18. A non-transitory computer-readable medium, having stored thereon program instructions that, upon execution by a computing system, cause the computing system to perform operations comprising:
determining that a first proxy server is to share security credentials with a set of one or more proxy servers when a unique identifier of the first proxy server has been added to a list, wherein the set of one or more proxy servers is represented by the list of their respective unique identifiers and is associated with the security credentials, and wherein the set of one or more proxy servers includes a second proxy server;
transmitting, to the second proxy server, a request for the first proxy server to have access to the security credentials; and
receiving, from the second proxy server, a credential key in an encrypted form, wherein the credential key is configured to decrypt the security credentials.

* * * * *